(12) United States Patent
Kelly et al.

(10) Patent No.: US 7,607,489 B2
(45) Date of Patent: Oct. 27, 2009

(54) DISC HARROW AGRICULTURAL IMPLEMENT

(76) Inventors: Shane P. Kelly, P.O. Box 200, Booleroo Centre, South Australia (AU) 5482;
Peter L. L. Kelly, P.O. Box 100, Booleroo Centre, South Australia (AU) 5482

( * ) Notice: Subject to any disclaimer, the term of this patent is extended or adjusted under 35 U.S.C. 154(b) by 0 days.

(21) Appl. No.: 11/765,182

(22) Filed: Jun. 19, 2007

(65) Prior Publication Data
US 2008/0314606 A1 Dec. 25, 2008

(51) Int. Cl.
*A01B 7/00* (2006.01)
(52) U.S. Cl. ........................ 172/579; 172/311; 172/568; 172/612
(58) Field of Classification Search ................ 172/518, 172/527, 567, 568, 579, 586, 142, 152, 154, 172/178, 181, 196, 311, 440, 441, 551, 576, 172/595, 455, 314, 584, 454, 583, 140, 776, 172/22, 442, 145–147, 175, 612
See application file for complete search history.

(56) References Cited

U.S. PATENT DOCUMENTS 2,191,537 A * 2/1940 Miller ........................ 172/578
2,825,983 A * 3/1958 Finn ............................. 56/295
3,327,787 A * 6/1967 Adee ........................... 172/311
4,893,682 A * 1/1990 Smallacombe ............... 172/311
5,794,712 A * 8/1998 Phillips ....................... 172/459
5,881,820 A * 3/1999 Baker ......................... 172/455

FOREIGN PATENT DOCUMENTS

| SU | 0745395 A1 | 7/1980 |
| SU | 0982551 A2 | 12/1982 |
| SU | 1523061 A2 | 11/1989 |

* cited by examiner

*Primary Examiner*—Robert E Pezzuto
*Assistant Examiner*—Matthew D Troutman
(74) *Attorney, Agent, or Firm*—Dale J. Ream

(57) ABSTRACT

An agricultural implement includes first and second outer harrows positioned adjacent front and left sides and front and right sides of a frame, respectively, at generally opposite diagonal directions. Third and fourth harrows are similarly positioned adjacent rear and left sides and rear and right sides of the frame, respectively, at generally opposite diagonal directions. The implement may include inner harrows positioned to close gaps left by the outer harrows and positioned at generally opposite diagonal configurations. Each harrow includes a plurality of discs and a chain with a plurality of links that are rotatable about the longitudinal direction of the chain so as to affect multi-purpose actioning of the soil by being able to level the surface rather than dragging material while also breaking up or uprooting weeds or stubble. Left and right sides of the frame are foldable upwardly and inwardly for transport and storage.

16 Claims, 12 Drawing Sheets

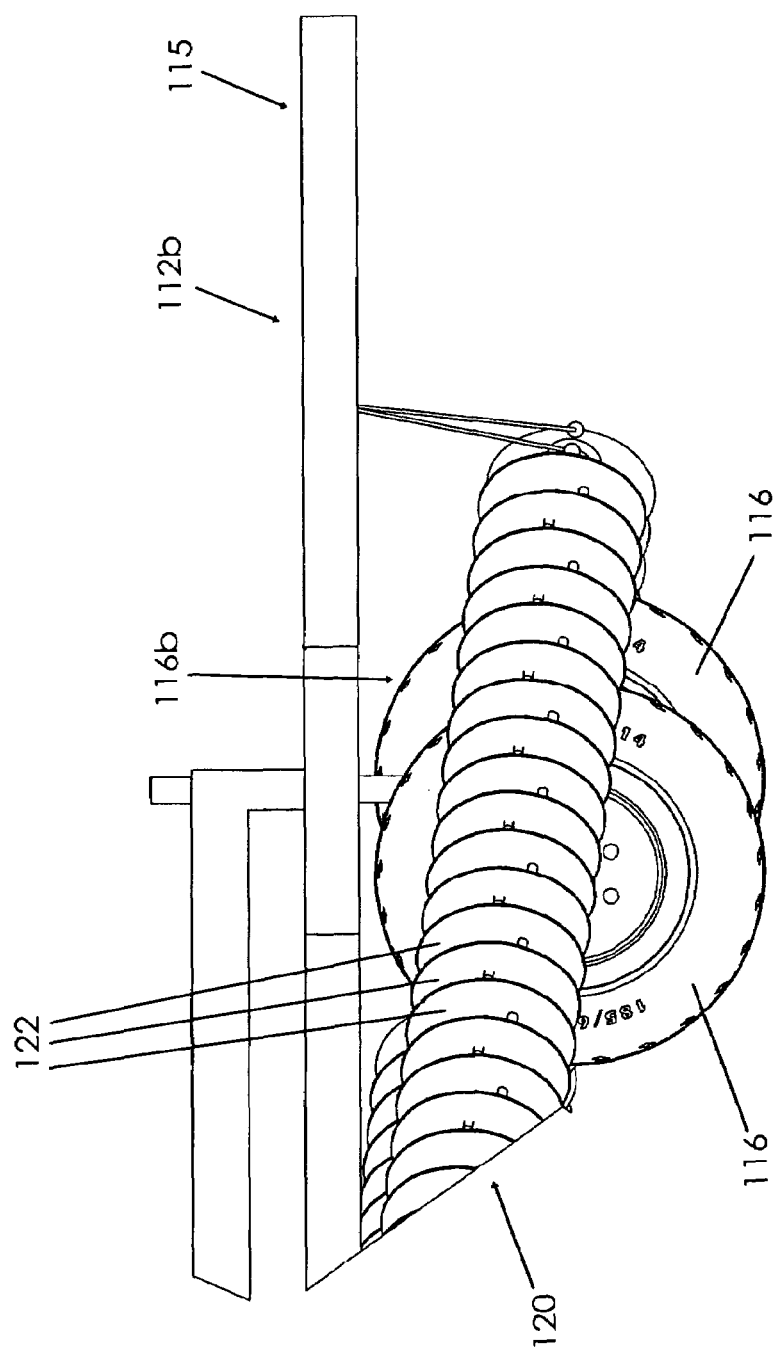

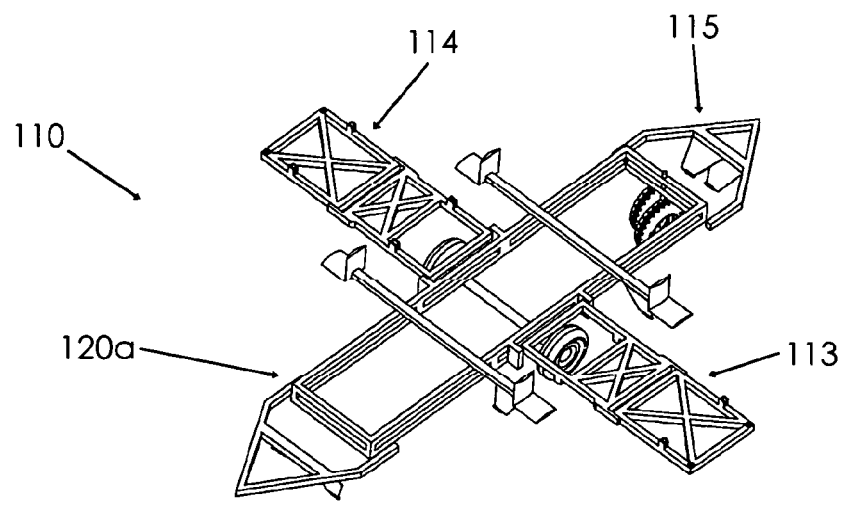
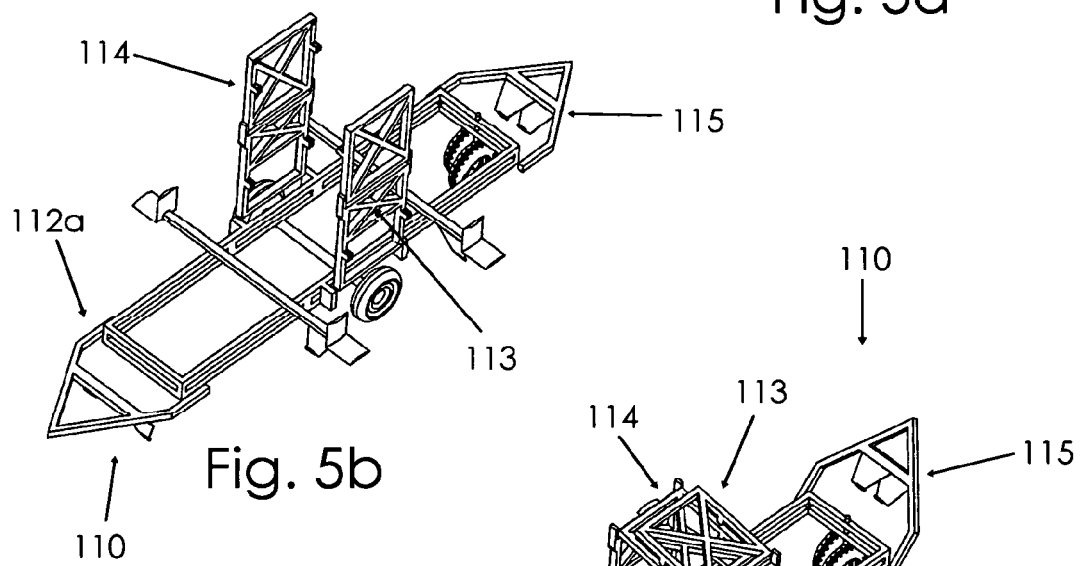
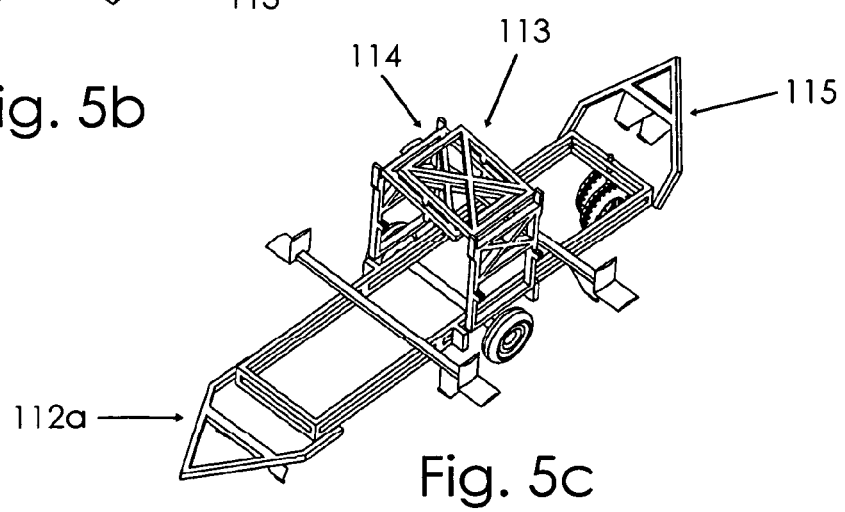

DISC HARROW AGRICULTURAL IMPLEMENT

BACKGROUND OF THE INVENTION

This invention relates generally to agricultural equipment and, more particularly, to an agricultural implement that does not merely clear away material on top of a ground surface but rather is able to furrow the soil, break up the material so it can be incorporated into the ground or decomposed. The agricultural implement also provides for the leveling of the soil and uprooting of weeds.

Farmed land by its nature undergoes cyclic periods of sowing, growth, and harvest. Sowing, growing and harvesting of crops all require the certain conditioning of the soil if successful returns are going to be obtained from the worked area. Conditions left over a farmed area particularly after harvest do not normally provide the ideal conditions in which further crops can be sowed. When the main crop is harvested the soil often includes weeds that need to be destroyed as well as stubble and the like from previous crops requiring uprooting and cutting before any seed can be sowed.

Not only does stubble require uprooting or cutting and weeds still need to be killed off, but there is also the further requirement of having the soil leveled such that sowing implements responsible for reintroducing a new crop into the field can do so efficiently and expeditiously.

Though in the past various agricultural implements have been provided that attempt to address certain of the above referenced ground engaging problems associated with uprooting or cutting of stubble, killing of weeds and also leveling, as to date there is yet to be provided one multi purpose simple structural agricultural piece of apparatus that can achieve all these objectives when engaging a ground surface. Further, existing proposals may even lead to an exaggeration of some of the problems also discussed above.

For example, a Russian patent referred to as SU1523061 discloses a heavy chain having a sequence of interconnected links that may be pulled along by a tractor or the like. The chain is able to pick up any debris, stubble or other material left on the surface and as it works its way across a field, it essentially drags this material like a rake, and slowly levels out the ground left behind. A problem with this construction is that as the chain has no special characteristics other than simply being interconnected links with no set rotation or the like, the chain simply operates like one large heavy broom or rake which would carry the material along in a sweeping action rather than have the material settle in situ as part of the leveling process.

The chain in this Russian invention has no capabilities of killing weeds that remain on the surface nor can it effectively uproot or cut stubble and leave such material in place. As explained above, rather than simply uprooting or cutting the stubble left on the surface, the chain would pull and sweep this material away from the location from where it was originally derived from. Hence, the swept away material has no opportunity to decompose and return to the soil. At best the agricultural implement was adapted to ground engage in SU1523061 for a raking effect of the ground by virtue of blades or spikes that preceded the chain, and thereafter a flattening or sweeping effect was provided for by the chain. The mere raking of material on the land being tillaged is undesirable as it removes important nutrient derivable from the stubble and the like and also exposes fresh soil to wind erosion and the like.

There have been further proposal whereby chains have been used to address some of the problems discussed above, but again each of these agricultural implements, in seeking to solve the problem of one aspect, tend to exaggerate problems associated with the other aspects. For example, U.S. Pat. No. 4,893,682 provides for an agricultural implement in which a rotating flexible chain can assist in soil erosion control. Nonetheless, the intended purpose of the invention is simply to slow down erosion by controlling water movement, which is done by the creation of dimples or miniature dams or the like across the ground surface as the chain is passed there along. The creation of these dimple features results from the unique baffles or blades that extend out from longitudinal links. Though the chain is being pulled along by a tractor or the like, it still does not have a multi-purpose function that is able to provide ground leveling, weed control and stubble break up substantially in situ. As with the chain provided for in the Russian document referred to above, all this chain does is provide a raking effect.

Although the devices proposed by SU745395 and SU982551 are potentially able to provide some ground leveling effect, there is no mechanism to break up stubble, nor is there the ability to control the weed, by cutting up the weeds with the action of some further structural feature.

Therefore, it would be desirable to have an agricultural device that does not just clear away material from the top of a ground surface, but rather breaks up the material and furrows the ground so that the broken up material may be incorporated into the soil or decomposed. Further, it would be desirable to have an agricultural implement that levels a ground surface, does not allow its chain harrows to become high centered, and which includes auxiliary and redundant harrows for efficient and complete breaking up and harrowing of surface materials and soil.

SUMMARY OF THE INVENTION

Accordingly, an agricultural implement according to the present invention includes a frame having a front end, a rear end, a left side, a right side, and a plurality of tires. Further, the implement includes a plurality of harrow members, each harrow member having plurality of discs and a chain with a plurality of links. The discs are coupled to the links and extend generally outwardly therefrom. A first harrow is operatively coupled to the frame generally adjacent to the front end and said left side, wherein the first harrow member extends in a first diagonal direction. A second harrow member is operatively coupled to the frame generally adjacent the front end and right side, wherein the second harrow member extends in a second diagonal direction. A third harrow member is operatively coupled to the frame generally adjacent the left side and the rear end, wherein the third harrow member also extends in the second diagonal direction. A fourth harrow member is operatively coupled to the frame generally adjacent the right side and the rear end, wherein the fourth harrow member extends in the first diagonal direction. Additional harrow members may be positioned to the interior of the harrows disclosed above and may be situated at opposing diagonal configurations.

Each chain has a front end and a rear end with each chain front end being relatively forward of the chain rear end. Further, each disc has a concave side facing a respective chain front end and a convex side facing a respective chain rear end. The first, second, third, and fourth harrows are outer harrow members. Each outer harrow member chain has an end coupled to a tensioning assembly such that the harrow member remains flexible to conform to a ground surface but with tension not to either bottom out in low areas or to glide over high areas without digging in.

It is important that the concave portions of the discs generally face forward. This facilitates a greater ability to engage the soil and to furrow the soil. In essence, this orientation may actually contribute to a sharpening of the leading edge of the disc so as to allow it to more effectively cut and uproot weeds and improves the effect of mulching the stubble. In addition, the forward orientation of the concave portions more effectively turns the soil for creating a greater ability to level uneven fields. The greater movement of soil is also beneficial when using the harrow to incorporate beneficial seeds, manures, and fertilizers into the soil.

The agricultural implement also includes a pair of offset rear wheels that inhibit the harrow members from becoming high centered when one portion of the implement is situated over a low area, e.g. a water furrow, while another portion is over a high area. More particularly, the offset wheels assist in keeping the entire implement properly positioned over a ground surface while being dragged over uneven portions of a field.

Therefore, a general object of this invention is to provide an agricultural implement for breaking up the ground, furrowing it, and depositing the broken up material back into the ground.

Another object of this invention is to provide an agricultural implement, as aforesaid, that levels the ground by maintaining its flexible chain harrows in tension.

Still another object of this invention is to provide an agricultural implement, as aforesaid, that includes multiple chain harrows in diagonal configurations for breaking up soil and other material.

Yet another object of this invention is to provide an agricultural implement, as aforesaid, that keeps its chain harrows from becoming high centered.

A further object of this invention is to provide an agricultural implement, as aforesaid, in which its plurality of concave discs and chain links enable material to pass through rather than being dragged along.

A still further object of this invention is to provide an agricultural implement, as aforesaid, having chain and disc links that are rotatable about the longitudinal direction of the chain so as to effect multi-purpose actioning of the soil by being able to level the surface rather than dragging material while also breaking up or uprooting weeds or stubble.

Still another object of this invention is to provide an agricultural implement, as aforesaid, in which the main framework includes left and right folding members that may be folded both upwardly and inwardly for transport and storage.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3 is an isolated view on an enlarged scale of the offset wheels as shown in FIG. 1;

FIG. 4a is a top view of a chain harrow member removed from the agricultural implement as in FIG. 1;

FIG. 4b is an isolated view on an enlarged scale taken from a portion of the harrow member of FIG. 4a;

FIG. 5a is a perspective view of the agricultural implement on a reduced scale as in FIG. 1 with the side members in an unfolded configuration;

FIG. 5b is a perspective view of the agricultural implement as in FIG. 5a with the side members in an upwardly folded configuration;

FIG. 5c is a perspective view of the agricultural implement as in FIG. 5a with the side members in an upwardly and inwardly folded configuration;

DESCRIPTION OF THE PREFERRED EMBODIMENT

Figure 1:
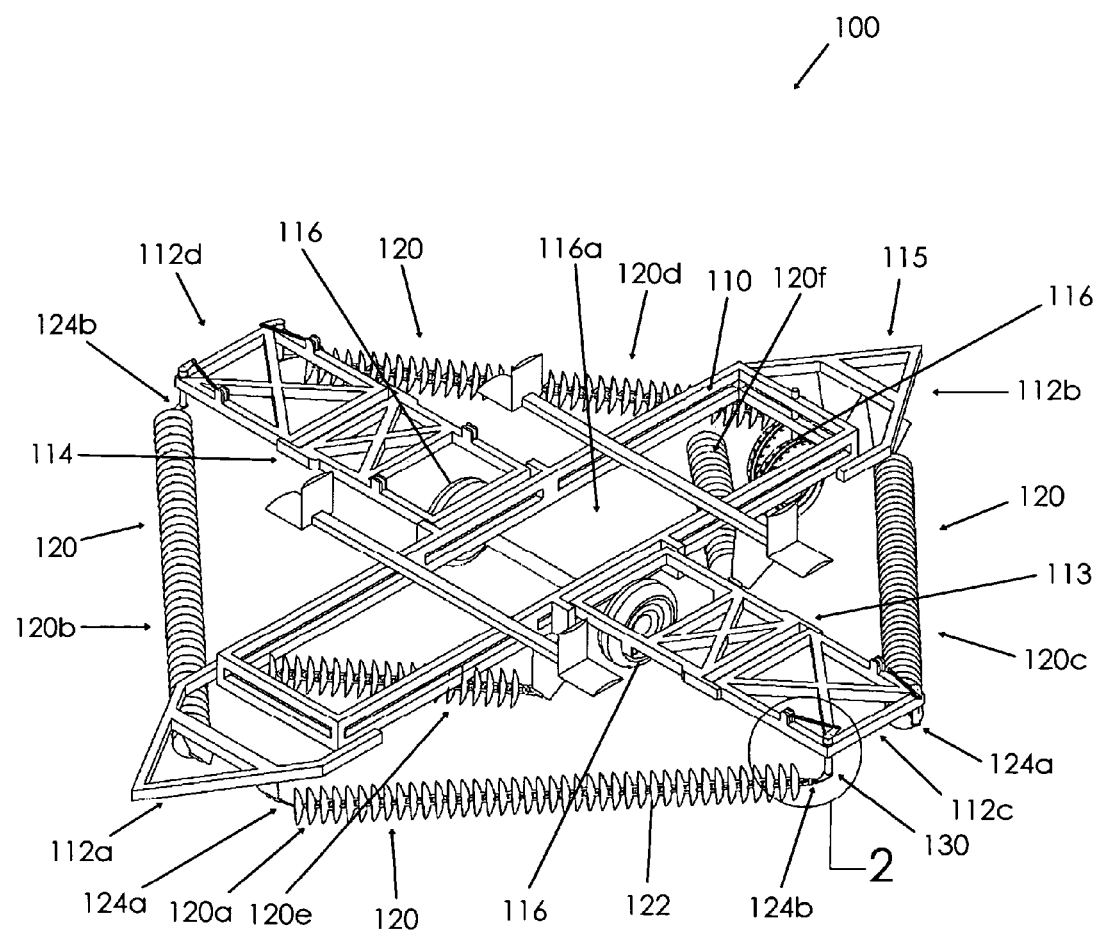
FIG. 1 is a perspective view of an agricultural implement according to a preferred embodiment of the present invention.

An agricultural implement 100 (also referred to herein as a "harrow device") according to the present invention will now be described in detail with reference to FIGS. 1 through 12 of the accompanying drawings. More particularly, an agricultural implement 100 according to the current invention includes a frame 110 and a plurality of harrow members 120.

The frame 110 has a front end 112a, a rear end 112b, a left side 112c, and a right side 112d. As shown in FIGS. 5a through 5c, a first folding member 113 may define the left side 112c, and a second folding member 114 may define the right side 112d. The folding members 113, 114 may selectively fold upwardly (FIG. 5b) relative to a remainder 111 of the frame 110 and inwardly (FIG. 5c) relative to the remainder 111 of the frame 110. Similarly, a folding member 115 may define the rear end 112b, and the folding member 115 may selectively fold upwardly (FIG. 5c) relative to the remainder 111 of the frame 110. The folding described above may allow the frame 110 to travel on a roadway or in other areas having restricted widths and/or lengths.

The frame 110 may further include a plurality of tires 116. Two of the tires 116 may be coupled to the frame 110 in a generally central location 116a and may be generally coaxial (FIG. 1), and two of the tires 116 may be coupled to the frame 110 in a generally rearward location 116b and have offset axes (FIGS. 1 and 3). The offset axes of the tires 116 at the rearward location 116b may help keep the frame 110 from high-centering (or "bottoming out") when passing over a water furrow in a field or other similar obstacles, as one of the wheels 116 may remain on a higher side of the furrow even when the other does not.

Figure 9:
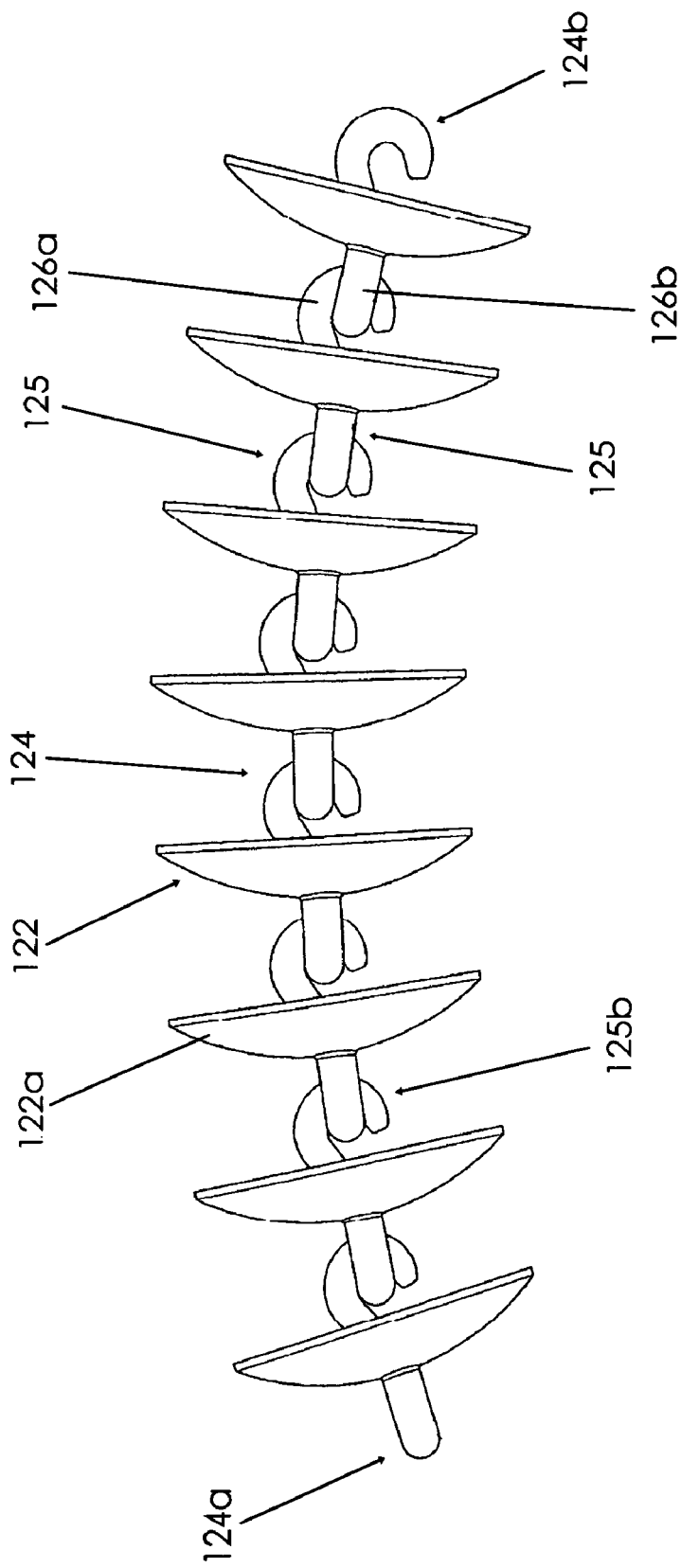
FIG. 9 is a side view of a portion of a harrow member as in FIG. 4b.
Figure 10:
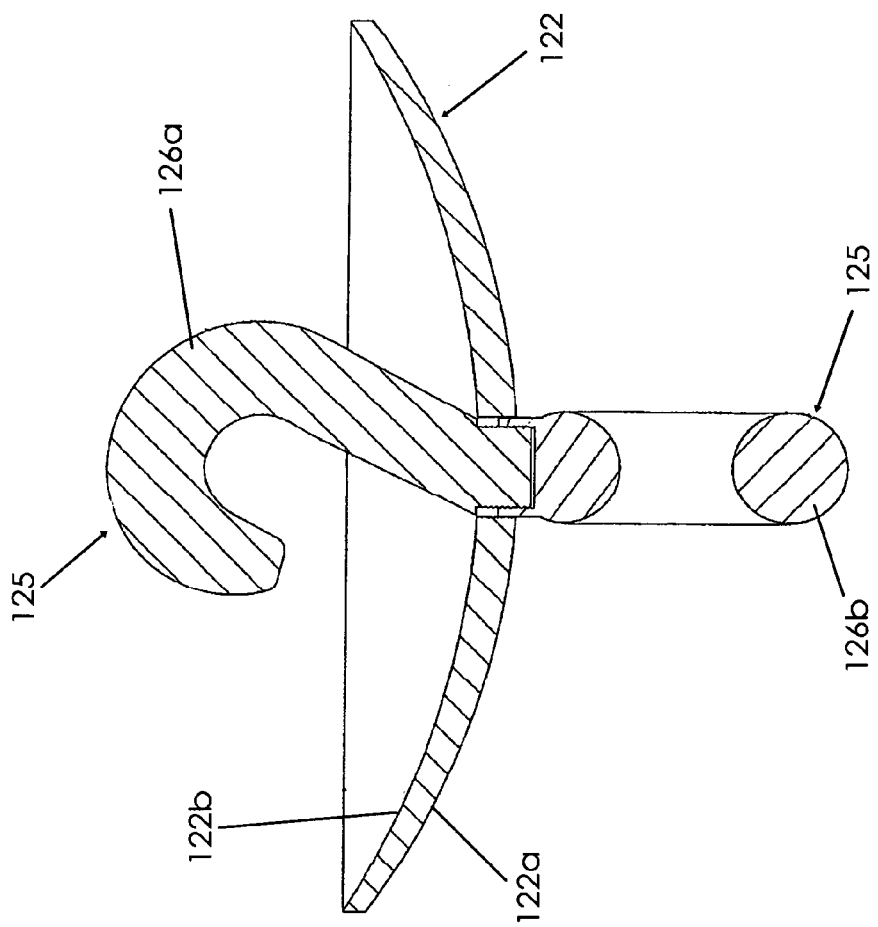
FIG. 10 is a cross sectional view of the disc as in FIG. 6 showing the disc and link with a separated construction
Figure 11:
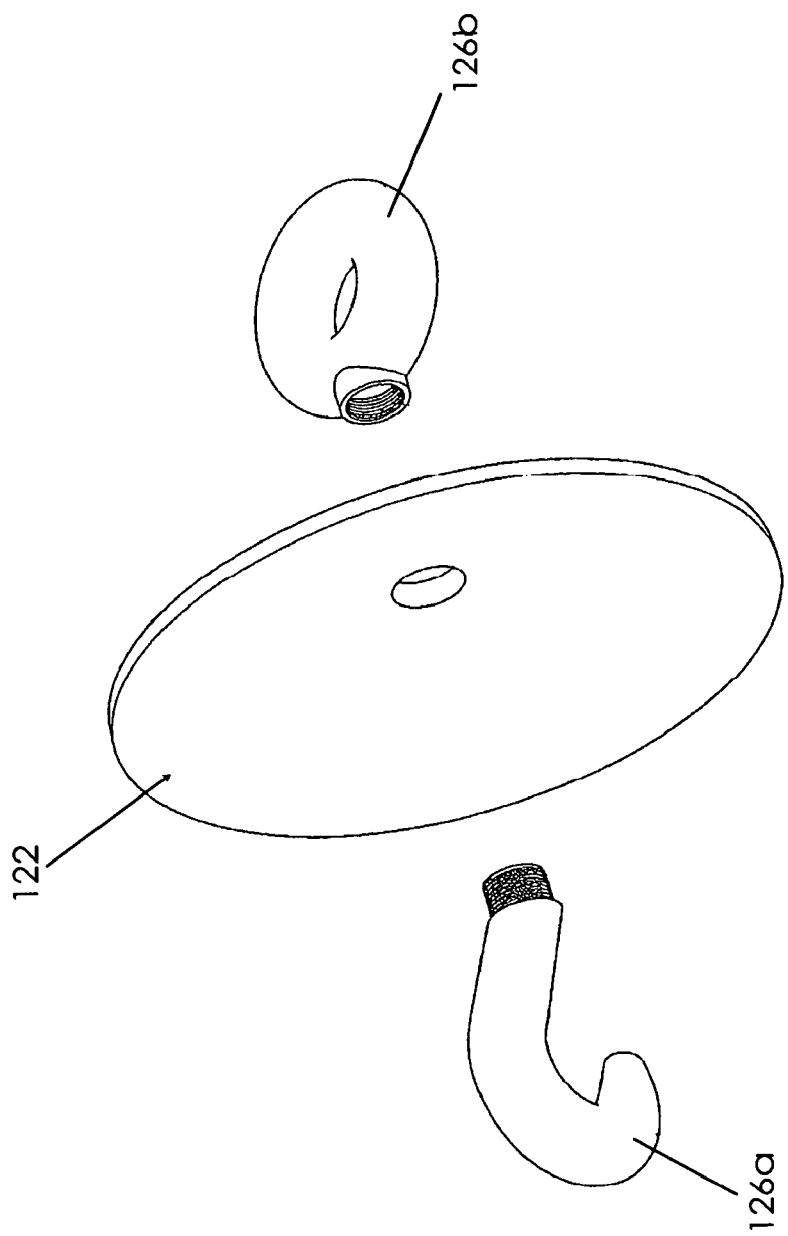
FIG. 11 is an exploded view of the disc as in FIG. 6.
Figure 12:
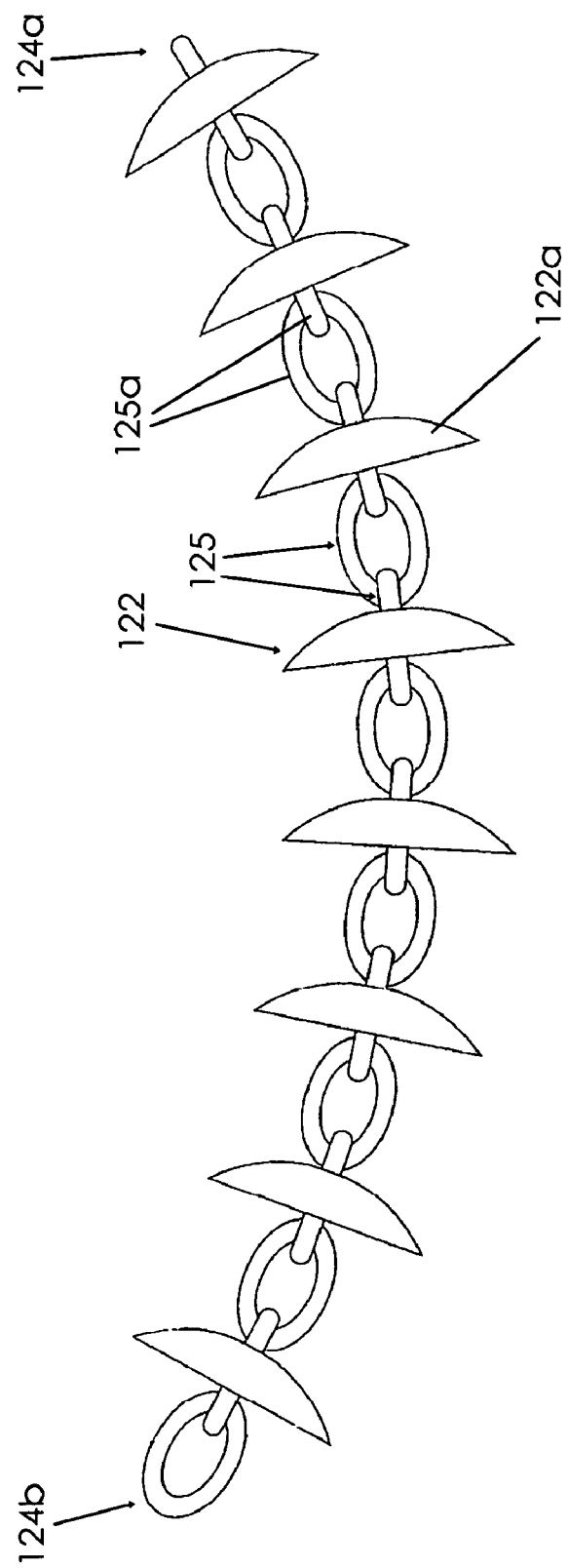
FIG. 12 is another perspective view of a chain harrow member.

Each harrow member 120 may include a plurality of discs 122 and a chain 124 with a plurality of links 125. As shown in FIGS. 4a, 4b, and 6 through 12, the discs 122 may be coupled to the links 125 and extend generally outwardly therefrom. Each chain 124 may have a front end 124a and a rear end 124b, each disc 122 may have a concave side 122b facing a respective chain front end 124a, and each disc 122 may have a convex side 122a facing a respective chain rear end 124b (FIGS. 4a, 8, 9, 10, and 12). The links 125 are preferably movable relative to one another and may be closed links 125a, such as links typically used in chains (FIGS. 4a, 4b, and 12), or the links 125 may be open links 125b with hook and loop portions 126a, 126b (FIGS. 6 through 11). The discs 122 may be coupled to every link 125 (FIGS. 4a and 4b), to approximately every second link 125 (FIG. 12), or otherwise as appropriate. If open links 125b are used, the hook portions 126a may be configured to receive a respective loop portion 126b of another link 125, and the loop portions 126b may be configured to receive a respective hook portion 126a of another link 125 (FIG. 9). In addition, the hook and loop portions 126a, 126b may be selectively separable, as shown in FIGS. 10 and 11. In other words, the hook and loop portions 126a, 126b may be screwed together or otherwise fastened to form loops 125.

Returning to FIG. 1, a first harrow member 120 (labeled 120a in FIG. 1) may be operatively coupled to the frame 110 generally adjacent the front end 112a and the left side 112c so that the first harrow member 120a extends in a first diagonal direction. A second harrow member 120 (labeled 120b in FIG. 1) may be operatively coupled to the frame 110 generally adjacent the front end 112a and the right side 112d so that the second harrow member 120b extends in a second diagonal direction generally opposite the diagonal direction of the first harrow member 120a. A third harrow member 120 (labeled 120c in FIG. 1) may be operatively coupled to the frame 110 generally adjacent the left side 112c and the rear end 112b so that the third harrow member 120c extends in generally the same diagonal direction as the second harrow member 120b. A fourth harrow member 120 (labeled 120d in FIG. 1) may be operatively coupled to the frame 110 generally adjacent the right side 112d and the rear end 112b so that the fourth harrow member 120d extends in generally the same diagonal direction as the first harrow member 120a.

The first and second harrow members 120a, 120b may be spaced apart adjacent the front end 112a, and the third and fourth harrow members 120c, 120d may be spaced apart adjacent the rear end 112b. To ensure that all ground surfaces passing underneath the frame 110 contact at least two harrow members 120 extending in opposite diagonal directions, fifth and sixth harrow members 120 (labeled 120e, 120f in FIG. 1) may be included. The fifth harrow member 120e may be operatively coupled to the frame 110 so that it extends in a diagonal direction over a space having a width that is as large as the space between the first and second harrow members 120a, 120b at the front end 112a and as large as the space between the third and fourth harrow members 120c, 120d at the rear end 112b. Similarly, the sixth harrow member 120f may be operatively coupled to the frame 110 so that it extends in a diagonal direction over a space having a width that is as large as the space between the first and second harrow members 120a, 120b at the front end 112a and as large as the space between the third and fourth harrow members 120c, 120d at the rear end 112b. The diagonal direction of the sixth harrow member 120f may be opposite the diagonal direction of the fifth harrow member 120e.

Figure 2:
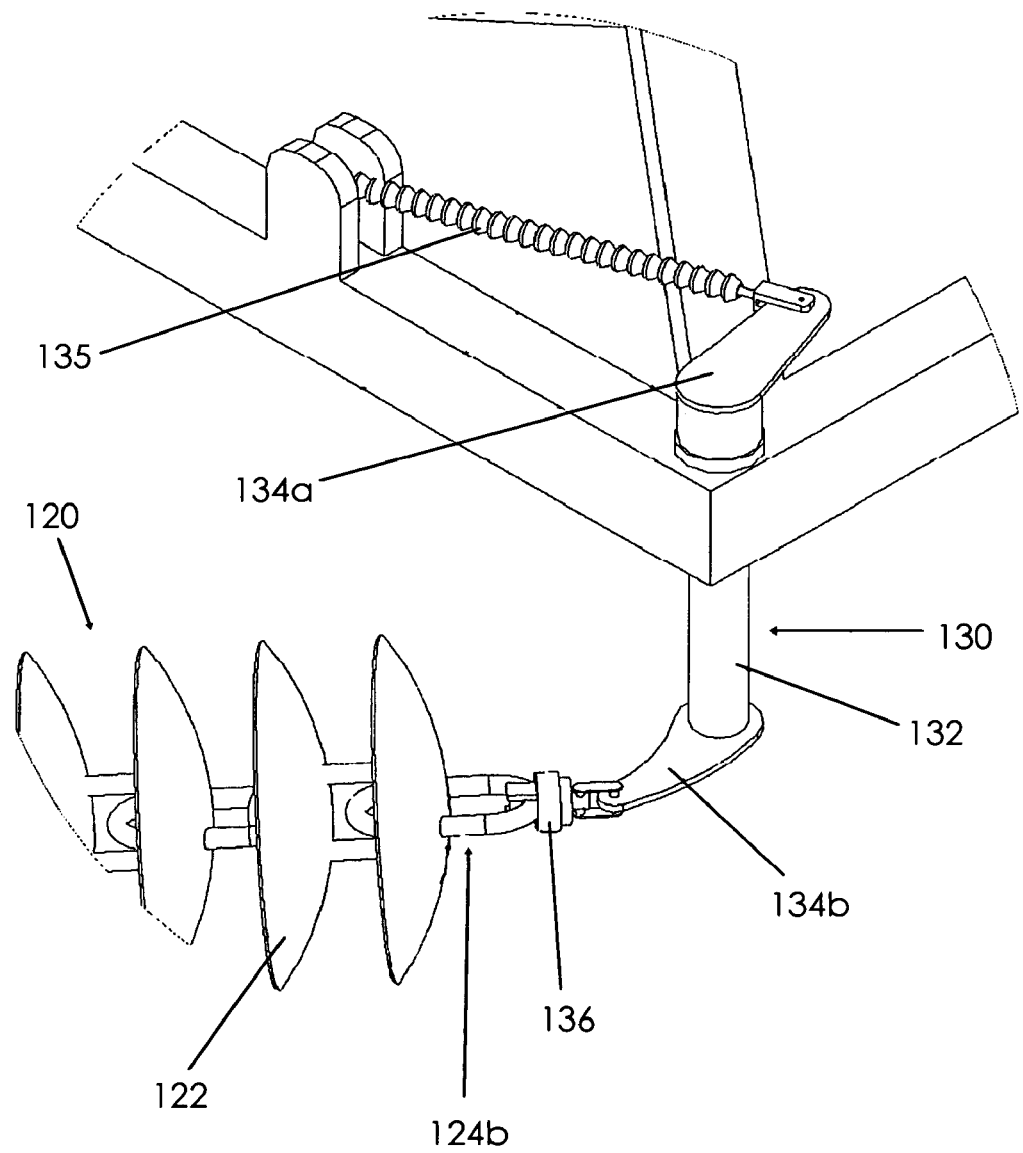
FIG. 2 is an isolated view on an enlarged scale taken from a portion of FIG. 1.
Figures 4A, 4B:
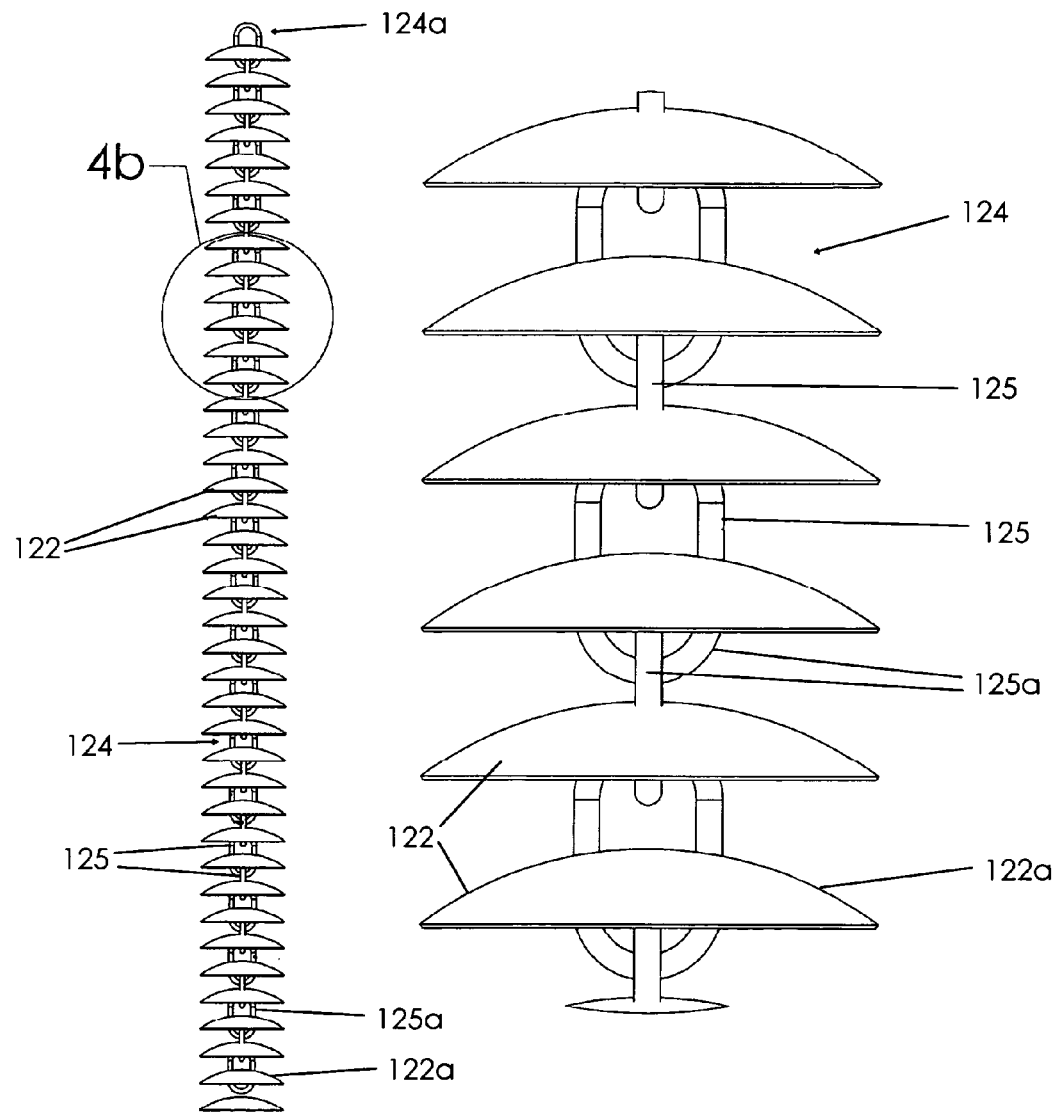
Figure 6:
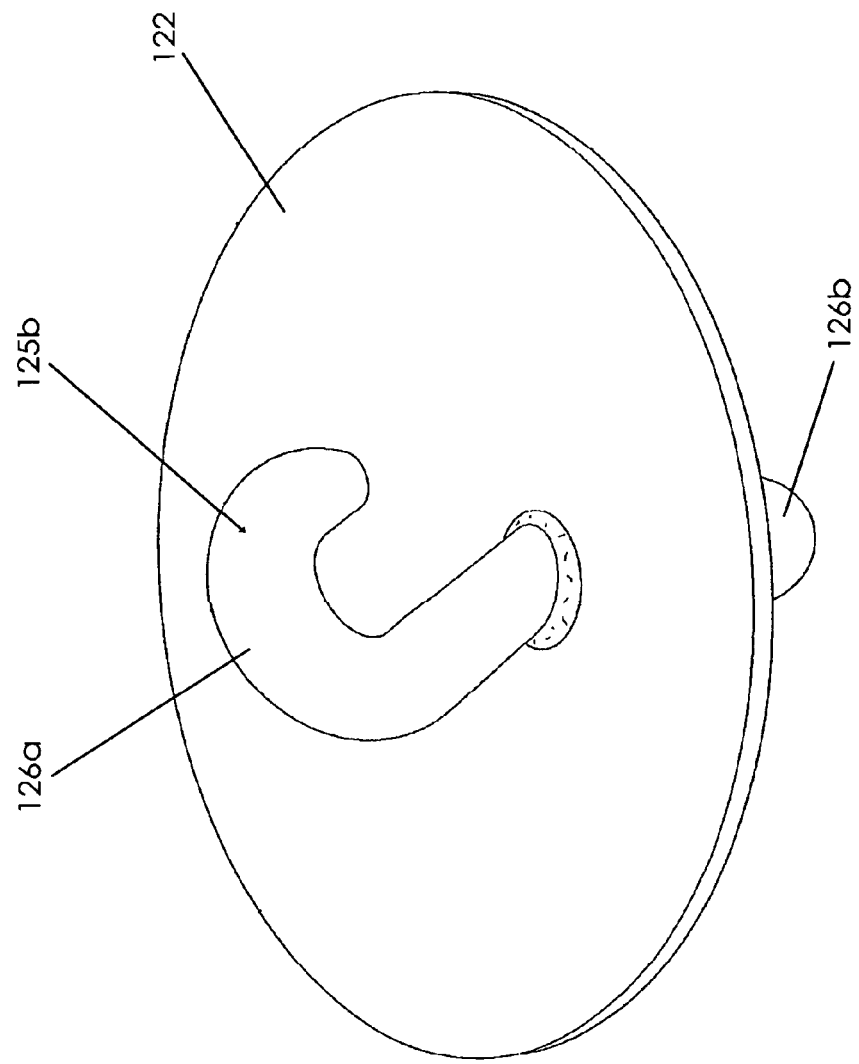
FIG. 6 is a perspective view of a disc removed from a harrow member wherein the link is an open link.
Figure 7:
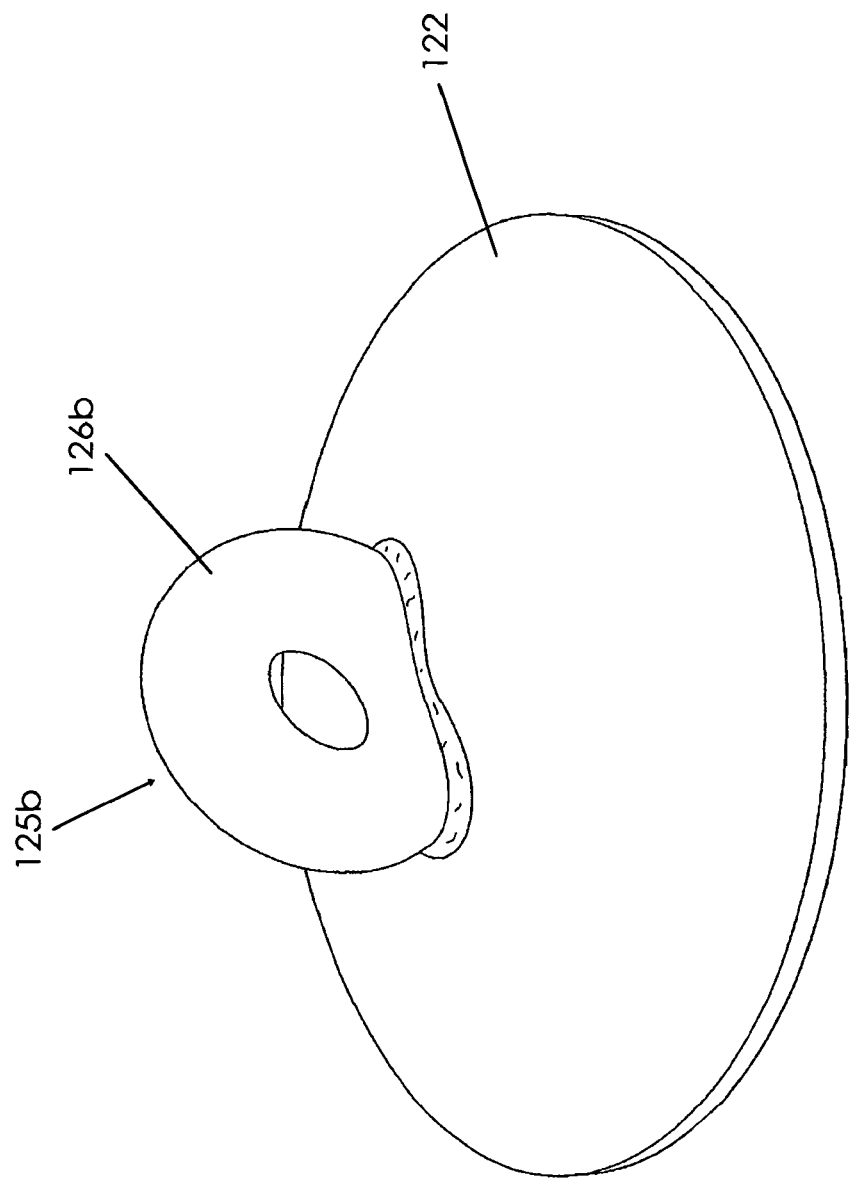
FIG. 7 is a perspective view of a disc removed from a harrow member, wherein the link is a closed link.
Figure 8:
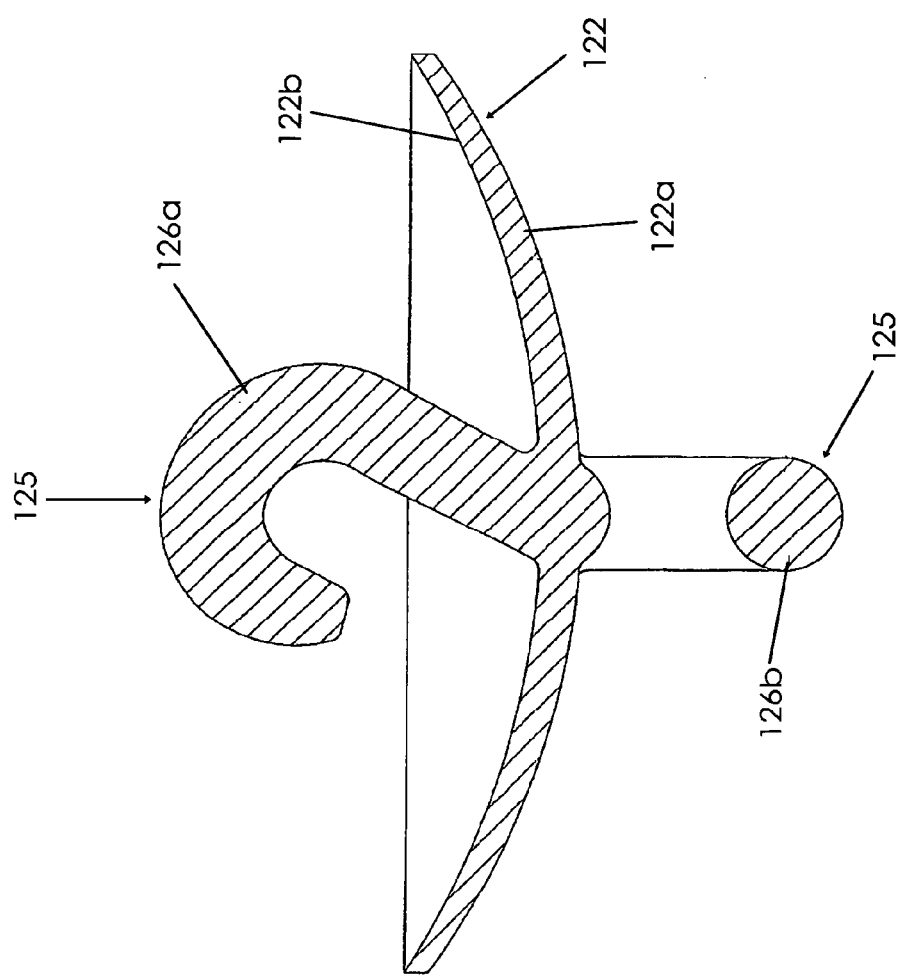
FIG. 8 is a cross sectional view of the disc as in FIG. 6 showing the disc and link with an integrated construction.

For each harrow member chain 124, the front end 124a may be relatively forward of the rear end 124b so that the concave sides 122b of the discs 122 face forward (toward the frame front end 112a). As best shown in FIG. 2, the chain 124 of each outer harrow member 120 (i.e., the first, second, third, and fourth harrow members 120a, 120b, 120c, 120d) may have an end 124a, 124b coupled to a tensioning assembly 130. Each tensioning assembly 130 may have a generally vertical shaft 132 passing through the frame 110. The shaft 132 may have upper and lower arms 134a, 134b that extend outwardly. The upper arm 134a may be coupled to the frame 110 by a spring 135, and the lower arm 134b may be coupled to a respective chain end 124a, 124b. A bearing 136 may couple each lower arm 134b to the respective chain end 124a, 124b to allow the chain ends 124a, 124b to rotate relative to the lower arms 134b.

In use, the frame 110 may be pulled across a ground surface (e.g., a field used for farming) by a tractor or another appropriate pulling device. The harrow members 120 may act to level the ground surface and additionally break up the ground surface without dragging and removing all of the top soil. More particularly, the links 125 of the chains 124 may rotate as they interact with the ground surface, causing the discs 122 to rotate and cut through the ground surface. The arrangement of the concave discs 122 may allow parts of the ground surface to pass through the chains 124 rather than simply being dragged along, as typically results when conventional chains are pulled across a ground surface.

By positioning the harrow members 120 as described above, two separate harrow members 120 may pass in opposite directions over every part of the ground surface under the frame 110, aiding the leveling and cutting effect of the harrow members 120. The bearings 136 may allow the chains 124 to rotate relative to the frame 110, and the tensioning assemblies 130 may keep the chains 124 in relative tension so that the chains 124 do not get forced too high over high spots of the ground surface or too low in low spots of the ground surface. In other words, the tensioning assemblies 130 may ensure that the harrow members 120 dig into the ground surface only when appropriate. To allow the agricultural implement 100 to travel on a roadway or in other areas having restricted widths and/or lengths, the folding members 113, 114, 115 may be folded as described above. Some or all of the harrow members 120 may or may not have to be removed from the frame 110 for the folding members 113, 114, 115 to be folded.

It is understood that while certain forms of this invention have been illustrated and described, it is not limited thereto except insofar as such limitations are included in the following claims and allowable functional equivalents thereof.

The invention claimed is:

1. An agricultural implement, comprising:
a frame having a front end, a rear end, a left side, a right side, and a plurality of tires;
a plurality of harrow members; each said harrow member having a plurality of discs and a chain with a plurality of links; said discs being coupled to said links and extending generally outwardly therefrom;
wherein a first said harrow member is operatively coupled to said frame generally adjacent said front end and said left side, wherein said first harrow member extends in a diagonal direction;
wherein a second said harrow member is operatively coupled to said frame generally adjacent said front end and said right side, wherein said second harrow member extends in a diagonal direction;
wherein a third said harrow member is operatively coupled to said frame generally adjacent said left side and said rear end, wherein said third harrow member extends in a diagonal direction;
wherein a fourth said harrow member is operatively coupled to said frame generally adjacent said right side and said rear end, wherein said fourth harrow member extends in a diagonal direction;
wherein:
said first, second, third, and fourth harrow members are outer harrow members;
each said outer harrow member chain has an end coupled to a tensioning assembly; and
each said tensioning assembly has a generally vertical shaft passing through said frame and having upper and lower arms extending outwardly therefrom, said lower arm being coupled to a respective said chain end, said upper arm being coupled to said frame by a spring.

2. The agricultural implement as in claim 1, wherein respective discs are coupled to approximately every second said link in each said chain.

3. The agricultural implement as in claim 1, wherein:
each said chain has a front end and a rear end, each said chain front end being relatively forward of said chain rear end; and
each said disc has a concave side facing a respective chain front end and a convex side facing a respective chain rear end.

4. The agricultural implement as in claim 1, wherein:
said first and second harrow members are spaced apart adjacent said frame front end;
said third and fourth harrow members are spaced apart adjacent said frame rear end;
a fifth said harrow member is operatively coupled to said frame and extends in a diagonal direction;
a sixth said harrow member is operatively coupled to said frame and extends in a diagonal direction opposite said diagonal direction of said fifth harrow member; and
all ground surfaces passing underneath said frame contact at least two said harrow members extending in opposite diagonal directions.

5. The agricultural implement as in claim 1, wherein:
two said tires are coupled to said frame in a generally central location and are generally coaxial; and
two said tires are coupled to said frame in a generally rearward location and have offset axes.

6. The agricultural implement as in claim 1, wherein:
said frame has a first folding member that defines said frame left side;
said frame has a second folding member that defines said frame right side; and
each said folding member selectively folds upwardly relative to a remainder of said frame and inwardly relative to said remainder of said frame.

7. The agricultural implement as in claim 1, wherein:
said frame has a folding member that defines said frame rear end; and
said folding member selectively folds upwardly relative to a remainder of said frame.

8. The agricultural implement as in claim 1, wherein a bearing couples each said lower arm to each said chain end to allow rotation of said chain ends relative to said lower arms.

9. The agricultural implement as in claim 1, wherein each said chain link is movable relative to each other said chain link.

10. The agricultural implement as in claim 1, wherein:
at least one said chain link includes a hook portion and a loop portion;
said hook portion is configured to receive a respective loop portion of another said chain link; and
said loop potion is configured to receive a respective hook portion of another said chain link.

11. The agricultural implement as in claim 10, wherein at least one said hook portion and loop portion are selectively separable.

12. The agricultural implement as in claim 1, wherein at least one said link is a closed link.

13. A harrow device, comprising:
a frame having a front end, a rear end, a left side, and a right side; and
a plurality of harrow members; each said harrow member having plurality a of discs and a chain with a plurality of links; said discs being coupled to said links and extending generally outwardly therefrom;
wherein a first said harrow member is operatively coupled to said frame generally adjacent said front end and said left side, whereby said first harrow member extends in a first diagonal direction;
wherein a second said harrow member is operatively coupled to said frame generally adjacent said front end and said right side, whereby said second harrow member extends in a second diagonal direction;
wherein a third said harrow member is operatively coupled to said frame generally adjacent said left side and said rear end, whereby said third harrow member extends generally in said second diagonal direction;
wherein a fourth said harrow member is operatively coupled to said frame generally adjacent said right side and said rear end, whereby said fourth harrow member extends generally in said first diagonal direction;
wherein:
said first, second, third, and fourth harrow members are outer harrow members;
each said outer harrow member chain has an end coupled to a tensioning assembly;
each said tensioning assembly has a generally vertical shaft passing through said frame and having upper and lower arms extending outwardly therefrom, said lower arm being coupled to a respective said chain end, said upper arm being coupled to said frame by a spring; and
a bearing couples each said lower arm to each said chain end to allow rotation of said chain ends relative to said lower arms.

14. The harrow device as in claim 13, wherein:
each said chain has a front end and a rear end, each said chain front end being relatively forward of said chain rear end; and
each said disc has a concave side facing a respective chain front end and a convex side facing a respective chain rear end.

15. The harrow device as in claim 14, wherein:
at least one said chain link has a hook portion and a loop portion;
said hook portion is configured to receive a respective loop portion of another said chain link; and
said loop portion is configured to receive a respective hook portion of another said chain link.

16. The harrow device as in claim 13, wherein at least one said link is a closed link.

\* \* \* \* \*